(12) United States Patent
Bignolles

(10) Patent No.: US 7,863,592 B1
(45) Date of Patent: Jan. 4, 2011

(54) OPTICAL NIGHT VISION DEVICE WITH STANDARD LIGHT INTENSIFIER

(75) Inventor: Laurent Bignolles, Bordeaux (FR)

(73) Assignee: Thomson-CSF Sextant, Velizy Villacoublay (FR)

(*) Notice: Subject to any disclaimer, the term of this patent is extended or adjusted under 35 U.S.C. 154(b) by 1826 days.

(21) Appl. No.: 09/455,745

(22) Filed: Nov. 19, 1999

(30) Foreign Application Priority Data

Dec. 8, 1998 (FR) .................................. 98 15480

(51) Int. Cl.
*G01J 5/00* (2006.01)
(52) U.S. Cl. .................. 250/526; 89/41.05; 348/143
(58) Field of Classification Search .......... 359/353, 359/409, 629; 250/214, 526, 204, 205; 89/41.05; 384/143
See application file for complete search history.

(56) References Cited

U.S. PATENT DOCUMENTS 4,653,879 A * 3/1987 Filipovich
6,088,165 A * 7/2000 Janeczko et al. ............ 359/629

* cited by examiner

*Primary Examiner*—Thomas H Tarcza
*Assistant Examiner*—Luke D Ratcliffe
(74) *Attorney, Agent, or Firm*—Oblon, Spivak, McClelland, Maier & Neustadt, L.L.P.

(57) ABSTRACT

The disclosure relates to a compact optical device, intended for use in a night vision telescope, that includes an objective, a standard light intensifier that rotates the image through 180° between its entry and its exit, an eyepiece, and four optical deflections, one in the objective and three in the eyepiece. The eyepiece, producing a single intermediate image between its entry and its exit, includes a combiner whose deflection angle α depends on its optical index n and the half-field θ of the device. The field width of the device is at least 40°. The invention is applicable notably to night vision binoculars for aircraft or helicopter pilots.

17 Claims, 3 Drawing Sheets

OPTICAL NIGHT VISION DEVICE WITH STANDARD LIGHT INTENSIFIER

CROSS-REFERENCE TO RELATED APPLICATIONS

This application claims priority under 35 U.S.C. §119(a) to French Patent No. 98-15480 filed Dec. 8, 1998.

BACKGROUND OF THE INVENTION

1. Field of the Invention

The invention relates to a night vision device worn on the user's head. More precisely, the invention is a device making use of a standard light intensifier and used in a compact night vision telescope.

2. Description of the Prior Art

The pupil of the eye collects the light rays emitted by the landscape to form an image on the retina. At night, the emitted light intensity is too low for the naked eye to achieve good perception of the environment, yet it remains sufficient to enable an image intensifier to form a visible image of the landscape electronically.

In a light intensifier, or image intensifier tube, the electrons emitted by a photocathode receiving photons from the landscape are multiplied, accelerated and directed onto a screen where an intensified image of the landscape, is formed. In a night vision device, the intensifier is associated with an objective that focuses the scene observed on the photocathode and with an eyepiece that transports an intensified, collimated image of the scene to the user's eye.

Today, the most common night vision devices are night vision binoculars in which the objective, the light intensifier and the eyepiece are aligned in front of the user's eye. The objective forms an image of the scene on the photocathode but it simultaneously imposes a rotation of 180° (the landscape appears upside down on the photocathode). To present the user with a visible image the right way up, a night vision binocular also includes an optical system to rotate the intensified image through 180°, generally a twisted bundle of optical fibers known as an inverter fibers bundle. Standard light intensifiers are widely commercialized; they incorporate a bundle of inverter fibers.

Night vision binoculars can be mounted on a helmet, notably that of an aircraft or helicopter pilot. However, these devices mounted in front of the user's eyes are inconveniently large. Their weight and the position of their center of gravity seriously increases the risk of injury to the pilot's head, notably in the event of sudden, unprepared ejection from the aircraft.

To reduce the overall size of the object mounted in front of the user's eyes, night vision binoculars incorporating optical deflections have been proposed. The U.S. Pat. No. 4,653,879 describes binoculars with an optical circuit positioned in a plane perpendicular to the viewing direction and in which the light is intensified; a mixer superimposes the intensified image on the user's direct view. The complete intensified optical channel includes 6 deflecting mirrors or prisms. Such binoculars a still heavy and too bulky to be placed inside the user's helmet.

Other night vision binoculars have been proposed with 4 optical deflections; each intensified channel includes an objective that performs two deflections, a specific light intensifier without inverter fibers that is positioned vertically and to one side of the user's eye, and an eyepiece that performs two further deflections. These binoculars are compact, light and compatible with the safety constraints imposed by the need for possible ejection of the wearer. However the use of a specific light intensifier results in high costs, in particular those of the certification procedure associated with the use of such binoculars in certain aircraft. The standard intensifier, although it includes an additional bundle of optical fibers compared with the specific intensifier, generally proves to be a much less expensive choice. The replacement of the specific intensifier by a standard intensifier in such binoculars would cause the intensified image of the landscape to be inverted; the addition of a block of inverter fibers to correct this inversion would excessively increase the overall height of these binoculars by raising the objective; binoculars including such a block are not compact.

SUMMARY OF THE INVENTION

The problem is therefore to design night vision binoculars, using a standard light intensifier, that are compact and compatible with an unprepared ejection of the wearer from an aircraft, while providing a wide field of vision of at least 40°.

The invention therefore proposes a night vision device including an objective that receives light from the scene being viewed along a first direction, a light intensifier, an eyepiece that outputs an intensified image along a second direction substantially parallel to said first direction, and means of guidance of the light rays between said objective and said output of the eyepiece, this guidance being achieved notably along an optical deflection plane that intersects said first and second directions and contains the longitudinal axis of said light intensifier, wherein said light intensifier assures a 180° rotation of the image between its entry and exit, and said means of guidance include 4 optical deflections, one in the objective and the three others in the eyepiece.

The longitudinal axis of the light intensifier is the axis along which the electrons emitted by the photocathode are accelerated, which is the axis perpendicular to the photocathode's tangent plane.

The eyepiece according to the invention produces a single intermediate image between its entry and its exit, and therefore between the image source and the eye of the user.

The light intensifier is preferably a standard light intensifier, notably an intensifier certified for equipping a device mounted in the vehicle in which the night vision device is used.

The eyepiece preferably includes a combiner whose angle $\alpha$, between the median ray of the central field and the deflection plane, depends on the optical index n of the combiner and the half-field $\theta$ of the device. The angle $\alpha$ of the combiner is greater than 45°.

The compact device according to the invention provides a field width of at least 40°.

The invention can include an additional image source enabling other information to be superimposed on the intensified landscape image, for example aircraft flight data.

BRIEF DESCRIPTION OF THE DRAWINGS

Other characteristics and advantages of the invention will become clear on reading the following detailed description of particular embodiments, making reference to the attached drawings in which the same items always carry the same reference number.

MORE DETAILED DESCRIPTION

Figure 1:
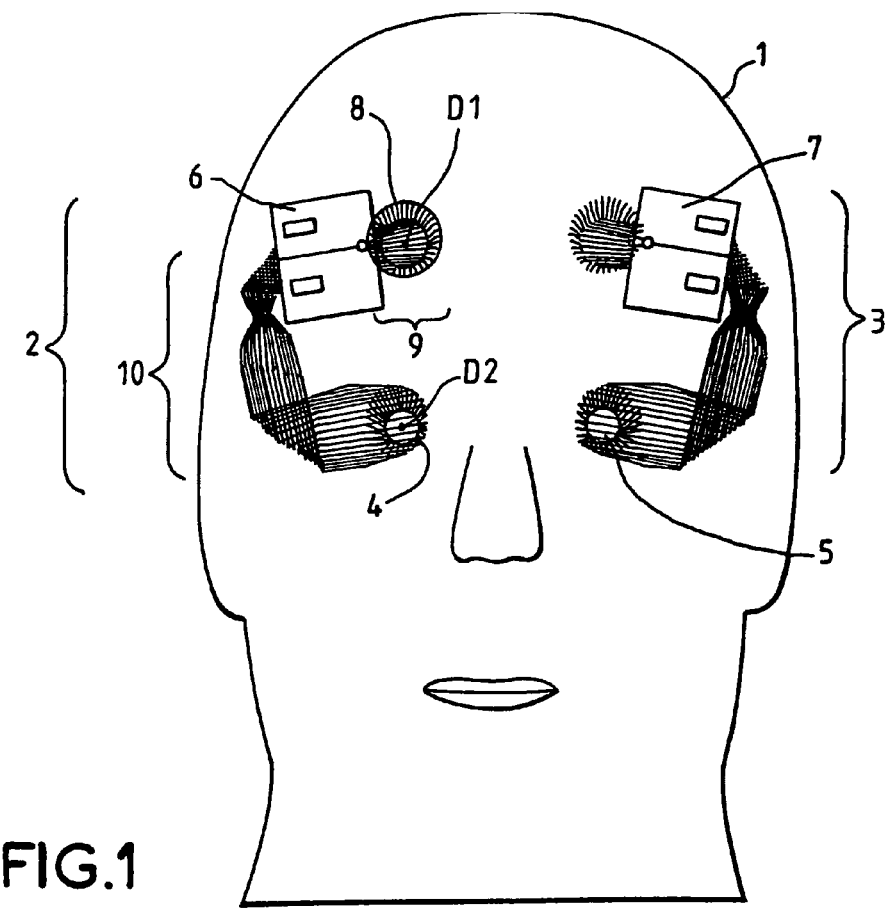
FIG. 1 shows a front view of the envelope of the path of the light rays for each eye of the user in a night vision device according to the invention.

FIG. 1 shows a front view of the head of a user 1 wearing a compact night vision device 2, 3 in front of each eye 4, 5; device 2 corresponds to the user's right eye 4. Each device is represented by the outline of the volume occupied by the light rays traversing it and of a cylindrical part representing the envelope of a light intensifier 6, 7 with inverter fibers. The intensifier 6, 7 is placed on the user's forehead, slightly to the side with respect to the eye; its longitudinal axis is substantially horizontal.

In the device 2, the aperture 8 of the objective 9 is located at forehead level, above the user's eye 4. Light emitted by the landscape is received along a first direction of observation D1 perpendicular to the aperture 8. The direction of the user's natural line of sight is along a second direction D2 different from the first direction D1; since the directions of observation D1 and D2 are preferably parallel, the distance between them is kept a small as possible. Across the width of the user's head, the distances between the two lines D1 and the two lines D2 are the same to within a few millimeters, which avoids horizontal parallax errors when a separate night vision device producing an intensified image of the landscape is used on each eye of the observer. The eyepiece 10 presenting the intensified image from the intensifier 6 to the eye 4 preferably includes a combiner that is transparent for the light rays received from the landscape along direction D2 and that assures the deflection of the light from the intensifier. The eye then receives an intensified image, observed by the objective in the direction D1, superimposed on the direct view of the landscape seen in the direction D2.

Figure 2:
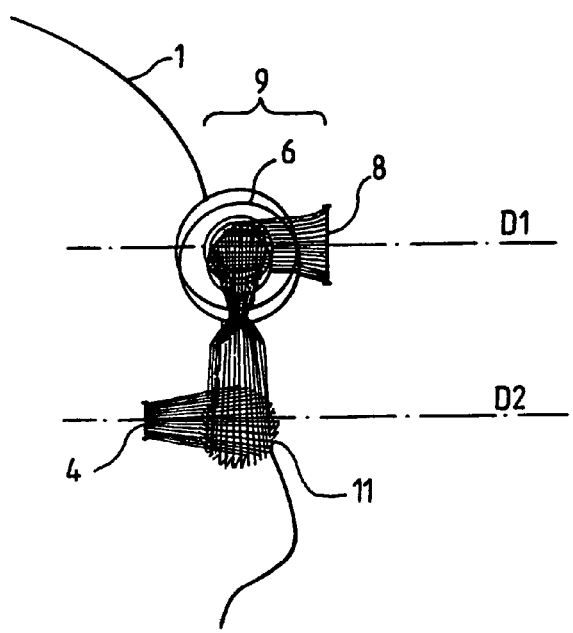
FIG. 2 shows the same envelope as in FIG. 1, but seen from the right side of the user's head.

In FIG. 2, the offset between the directions of observation D1 and D2 is shown relative to height of the user's head; the distance between the lines D1 and D2 is limited to about 4 centimeters. This offset leaves the user's direct line of sight unobstructed in direction D2 if the eyepiece includes a combiner 11 placed in front of the eye 4, while conserving an intensified image observed at a point close to the eye. This position of the viewing aperture of the compact device is notably compatible with the limited dimensions of a cockpit, such as that of a warplane, in which an observation point situated far above the eye would not allow a broad view of the landscape through the canopy, since it could be obstructed by the upper framework of the canopy.

Figure 3:
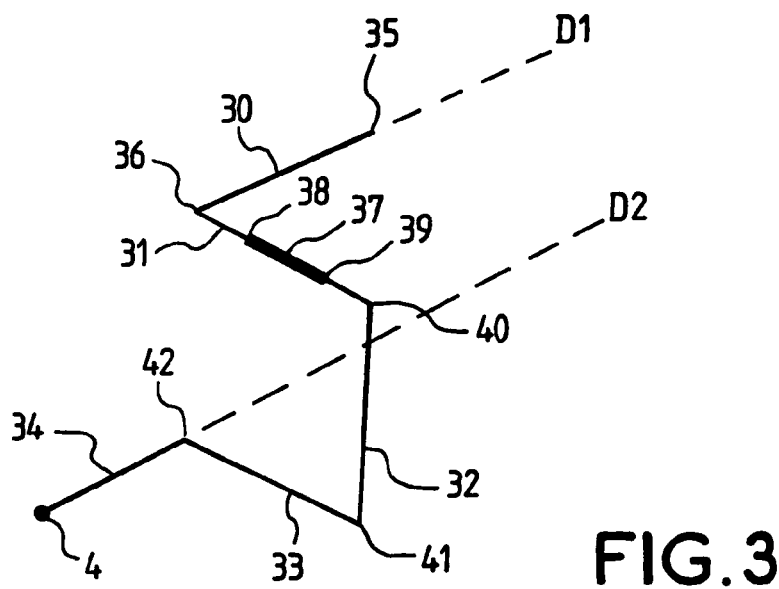
FIG. 3 is a simplified perspective diagram of a device according to the invention.

A compact device according to the invention is represented schematically in perspective in FIG. 3. The median ray of the central field of view of the device is shown as a solid line composed of 5 straight segments 30 to 34, no two successive segments being parallel. This light ray, arriving along a direction of observation D1, enters the device at the point 35 at the center of the aperture of the objective and follows the first segment 30. At deflection 36 it is deflected into an optical deflection plane intersecting the direction of observation D1 of the light to be intensified. It follows the segment 31 which coincides with the longitudinal axis 37 of the light intensifier. The median light ray of the central field leaves the objective and enters the intensifier, encountering the photocathode at point 38 on the segment 31. The objective thus forms an image of the landscape in the plane of the intensifier's photocathode, perpendicular to the second segment 31 at the point 38; the photocathode is located in the focal plane of the objective. The optical deflection plane is perpendicular to the plane of the photocathode.

The intensifier first displays an intensified image of the landscape (observed in direction D1), for example on the screen of a cathode ray tube, then it rotates this image through 180° along its longitudinal axis 37 aligned with the segment 31. In a standard light intensifier, this rotation is achieved by means of a twisted bundle of optical fibers, also known as the inverter fibers bundle. The image displayed at the output of the intensifier has a tangent plane substantially perpendicular to the current segment 31 at a point 39 and the median ray of the central field, drawn in FIG. 3, enters at this point 39 the eyepiece of the optical device.

The eyepiece is the part of the device between the output of the light intensifier and the user's eye 4. It present the user with an image that is preferably collimated. In the eyepiece, the light ray shown in FIG. 3 is subjected to a first deflection 40, for example towards the bottom of the user's face along a third straight segment 32. The second and third segments 31 and 32 lie in the optical deflection plane that intersects the direction of observation D1 and in which the light ray is subjected to a second deflection 41, this time along a fourth straight segment 33 substantially parallel to the second segment 31 along which the light entered the eyepiece. In the embodiment shown in FIGS. 1 and 2, the optical deflection plane is substantially vertical.

At the end of the fourth straight segment 33, the median ray of the central field is still in the eyepiece and it is subjected to a third deflection 42 which directs it outside the optical deflection plane, towards the eye 4, along a fifth straight segment 34 whose direction D2 is substantially parallel to the direction D1 of the light ray entering the objective.

Figure 4:
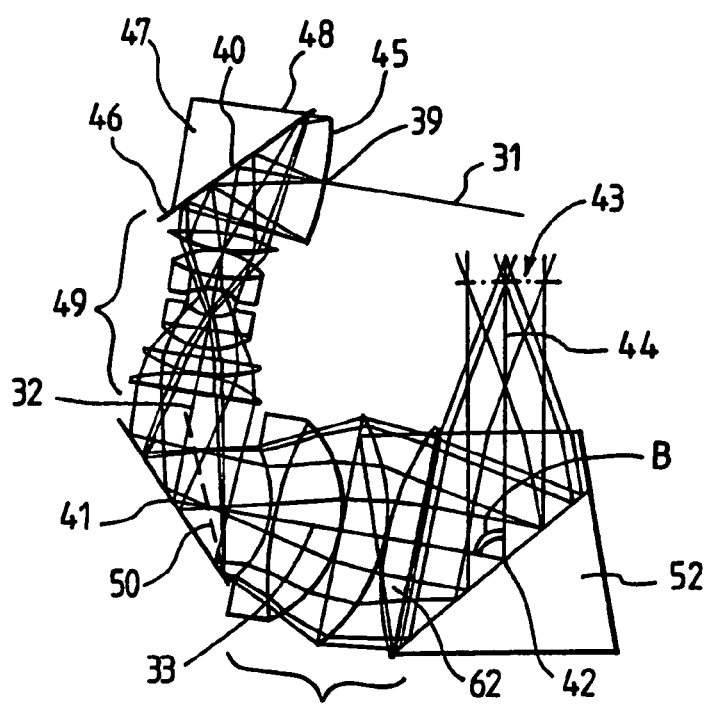
FIG. 4 is a diagram of an eyepiece according to the invention partially "folded" into the plane of the paper.

FIG. 4 shows an eyepiece according to the invention; it "flattened" into the plane of FIG. 4 which corresponds to the optical deflection plane containing the second, third and fourth straight segments 31, 32 and 33 described previously with reference to FIG. 3. The fifth straight segment 34, in the direction D2 and near the eye 4, in fact lies outside the optical deflection plane but it is represented folded down into the plane of FIG. 4 in the form of a segment 44 originating at the third optical deflection point 42 of the eyepiece. In FIG. 4, this segment 44 is perpendicular to a segment 43 that corresponds to a folded down representation of the pupil of the eye 4.

The intensifier assures the intensification and 180° rotation around its longitudinal axis of the incident light; it is an intensifier-inverter. Its output presents a surface whose tangent plane is perpendicular to the second straight segment 31. This surface is also the entry surface 45 in the eyepiece. In the eyepiece, the light ray following the segment 31 is subjected to a first deflection 40 of about 90° in the plane of FIG. 4 by a first deflection means 46 that is flat and substantially perpendicular to the plane of FIG. 4. This first deflection means 46 is a plane mirror, for example. In a variant of the embodiment, the first deflection means 46 is a combiner cube 47 that allows the another image displayed on one of its faces 48 to be superimposed on the intensified image obtained on the entry face 45 of the eyepiece located at the output of the assembly composed of the objective and the image intensifier-inverter. This other superimposed image could include, for example, information in symbolic form. The combiner cube 47 has the advantage of being located at some distance from the eye 4; it does not obstruct the user's direct field of view and it allows additional information to be displayed, for example flight data useful for a pilot.

After the first deflection 40, the light rays from the intensified image displayed on the output surface of the intensifier traverse a first set of lenses 49, then they are deflected through about 90° by a second deflection system 41. The central ray of the field of the objective, that entered the eyepiece along the second segment 31, now follows the fourth segment 33 (FIG. 3) which is parallel to and oriented in the opposite direction to the segment 31. The first set of lenses 49, centered on the third segment 32 of the device, produces an intermediate image 50 of the intensified image displayed on the entry surface 45 of the eyepiece. A second set of lenses 51 and a third means of deflection 42 enable the intensified image to be presented to the user's eye. The second set of lenses 51 preferably collimates the intermediate image.

The eyepiece according to the invention produces a single intermediate image 50 between the entry surface 45 of the eyepiece, on which the source image is formed, and the output of the eyepiece near which the user places the pupil 43 of his eye 4; in combination with an objective, the eyepiece enables an intensified image respecting the geometry of the landscape and produced by an intensifier-inverter to be presented to the user. The lenses of the first set 49 are of smaller diameter than the entry surface 45 of the eyepiece and the second set of lenses 51 assuring the collimation, so they do not substantially increase the weight of the night vision device of the invention. The third deflection 42 of the eyepiece is preferably provided by a combiner that assures both the deflection of the intensified light rays to the user's eye 4 and the transmission of light received directly from the landscape in direction D2. With the combiner, the intensified image acquired in direction D1 is superimposed on the direct view in direction D2.

In the invention, the third deflection 42 is for example a 90° deflection that directs the light ray of the fourth straight segment 33 along a line normal to the optical deflection plane; this plane is also perpendicular to the direction of observation D1. This deflection can be achieved by a mirror inclined at 45° with respect to the fourth segment 33, or by a classical combiner with an angle of 45°.

However, in the embodiment shown in FIG. 4, the third deflection 42 of the eyepiece is not a right angle: the angle between the fourth segment 33 that precedes the third deflection 42 of the eyepiece and the fifth segment 34 that follows it is strictly less than 90°; this angle is represented in FIG. 4 by the angle B between the fourth segment 33 and the folded-down representation 44 of the fifth segment 34. This deflection is performed by the combiner 52.

Figure 5:
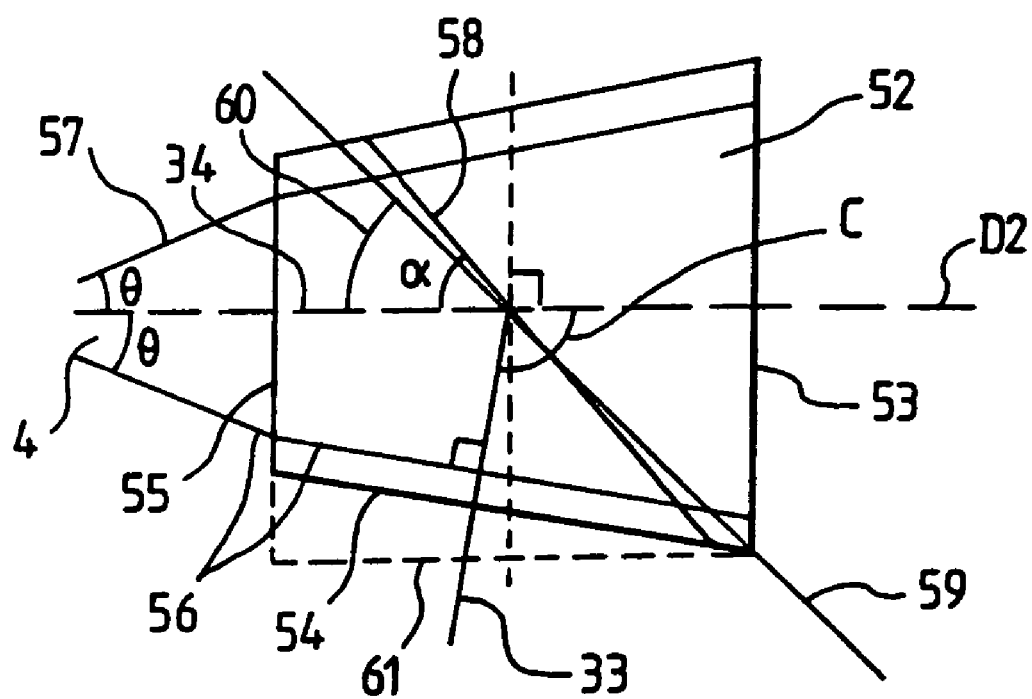
FIG. 5 shows a combiner according to the invention.

FIG. 5 shows a sectional view of the combiner 52 in the plane containing the fourth straight segment 33 and perpendicular to the optical deflection plane. The combiner 52 has a first entry face 53 perpendicular to the light rays received directly from the landscape along the viewing direction D2 and which are transmitted through the combiner. A second entry face 54, perpendicular to the fourth segment 33 of the night vision device, receives the intensified light that is to be deflected by the combiner. An exit face 55, perpendicular to the viewing direction D2 and located in front of the user's eye 4, is parallel to the first entry face 53. In a classical combiner, in which the angle 60 is equal to 45°, the second entry face 61 would be perpendicular to the first entry face 53.

The visual field perceived by the eye 4 of the user of the optical device is limited in width by the field border rays 56 and 57 that are inclined at an angle θ on each side of the median ray of the central field on the segment 34 in direction D2. The angle of inclination θ is known as the "half-field" of the device; the field of the device is equal to twice the angle θ. In the combiner according to the invention, the second entry face 54 is parallel to the path in the combiner of the field border ray 56. The combiner 52 is characterized by a deflection angle α, between the median ray of the central field and the deflection plane 58, that depends on the optical index n of the combiner and the half-field θ of the device according to the following equation, expressed in radians:

$$4\alpha = \pi + 2\mathrm{Arcsin}\left(\frac{\sin\theta}{n}\right)$$

The angle α of the combiner strictly exceeds 45°, by a non-zero value ε:

$$\alpha = \pi/4 + \epsilon$$

The combiner 52 is for example made of a crown-type glass of optical index n equal to 1.5 with an angle α of 51.6°; this enables a wide field aperture of 40° assuring, in particular, comfortable night vision for the pilot. In this particular example, the angle C between the direct channel in direction D2 and the intensified channel along the fourth segment 33 is not a right angle but is equal to 103.6°. The angle C of FIG. 5 is related to the angle B of FIG. 4 by the relation: $B+C=2\pi$ The combiner 52 presents the advantage of having an optical deflection plane closer to the user's temple than that of a classical combiner. In addition, the weight and center of gravity of the optical parts of the equipped device of this combiner 52 are more favorable for the user since the couple exerted on the bare head is less in this arrangement.

The combiner 52 according to the invention also has the advantage of being a little less voluminous and a little lighter than a classical combiner in which the angle 60 between the median ray of the central field and its deflection plane 59 would be equal to 45° and whose second entry face 61 would be farther from the median ray of the central field than the second entry face 54 of the combiner 52.

To avoid parasitic reflections on the second entry face 54 of the combiner prism 52 produced for example by total reflection in the prism of a ray slightly outside the field covered by the combiner, a variant of the embodiment consists in adding a lens 62, shown in FIG. 4, of which one face coincides with (and is preferably glued on) the second entry face 54 of the combiner prism. The lens 62 has a second face whose spherical surface avoids the total reflection. The lens 62 forms part of the second set of lenses 51 of FIG. 4.

Preferably, a deflection that is the complement of that produced by the eyepiece is performed in the objective; in this way a pair of binoculars provides total overlapping of the fields of vision of each eye of the user. The appropriate deflection is achieved by a prism for the deflection 36 in the objective. The objective has a diameter of about 18 millimeters, so the weight of the prism in the objective is relatively small compared to the weight of the combiner of the eyepiece whose diameter is larger (about 30 millimeters). The additional weight in the objective does not increase the overall weight of the device according to the invention which includes a lightweight combiner of angle α greater than 45° in the eyepiece.

What is claimed is:

1. Night vision device including:
   an objective configured to receive light from a scene being viewed along a first direction;
   a light intensifier configured to receive light from said objective, rotate light received from said objective 180° between an entry and exit of said light intensifier, and produce an intensified image;
   an eyepiece configured to output the intensified image along a second direction substantially parallel to said first direction; and, a guidance system comprising plural elements configured to produce a total of four optical deflections, including one deflection in the objective and three other deflections in the eyepiece, to guide light rays between said objective and an output of the eyepiece, wherein the guidance system is configured to guide said light rays along an optical deflection plane that intersects said first and second directions and includes a longitudinal axis of said light intensifier.

2. Device according to claim 1, wherein said eyepiece is configured to produce a single intermediate image between an entry face and an exit face of said eyepiece.

3. Device according to claim 1, wherein said light intensifier comprises plural inverter fibers configured to produce said 180° rotation.

4. Device according to claim 2, wherein said light intensifier comprises plural inverter fibers configured to produce said 180° rotation.

5. Device according to any one of claims 1-4, wherein said eyepiece includes a combiner configured to transmit light received directly from the scene in said second direction and to superimpose said light received directly from the scene on said intensified image.

6. Device according to claim 5, wherein said combiner is configured to have a deflection angle $\alpha$ between a median ray of a central field of the night vision device and a deflection plane of the combiner, said deflection angle $\alpha$ depends on an optical index n of the combiner and a half-field $\theta$ of the night vision device.

7. Device according to claim 6, wherein said deflection angle $\alpha$ and said half-field $\theta$ of the night vision device expressed in radians have the following relationship:

$$4\alpha = \pi + 2\text{Arcsin}\left(\frac{\sin\theta}{n}\right).$$

8. Device according to claim 5, wherein said deflection angle $\alpha$ is greater than 45°.

9. Device according to claim 6, wherein said deflection angle $\alpha$ is greater than 45°.

10. Device according to claim 7, wherein said deflection angle $\alpha$ is greater than 45°.

11. Device according to claim 8, wherein said combiner is configured to receive light directly from the scene through a first entry face and to receive the intensified image through a second entry face, and includes a lens having one face coincident with said second entry face of the combiner and another face configured to be spherical.

12. Device according to claim 9, wherein said combiner is configured to receive light directly from the scene through a first entry face and to receive the intensified image through a second entry face, and includes a lens having one face coincident with said second entry face of the combiner and another face configured to be spherical.

13. Device according to claim 10, wherein said combiner is configured to receive light directly from the scene through a first entry face and to receive the intensified image through a second entry face, and includes a lens having one face coincident with said second entry face of the combiner and another face configured to be spherical.

14. Binoculars including two night vision devices according to any one of claims 1-4.

15. Binoculars including two night vision devices according to claim 5.

16. Binoculars including two night vision devices according to claim 6.

17. Binoculars including two night vision devices according to claim 7.

* * * * *